Figures 1, 2, 3:
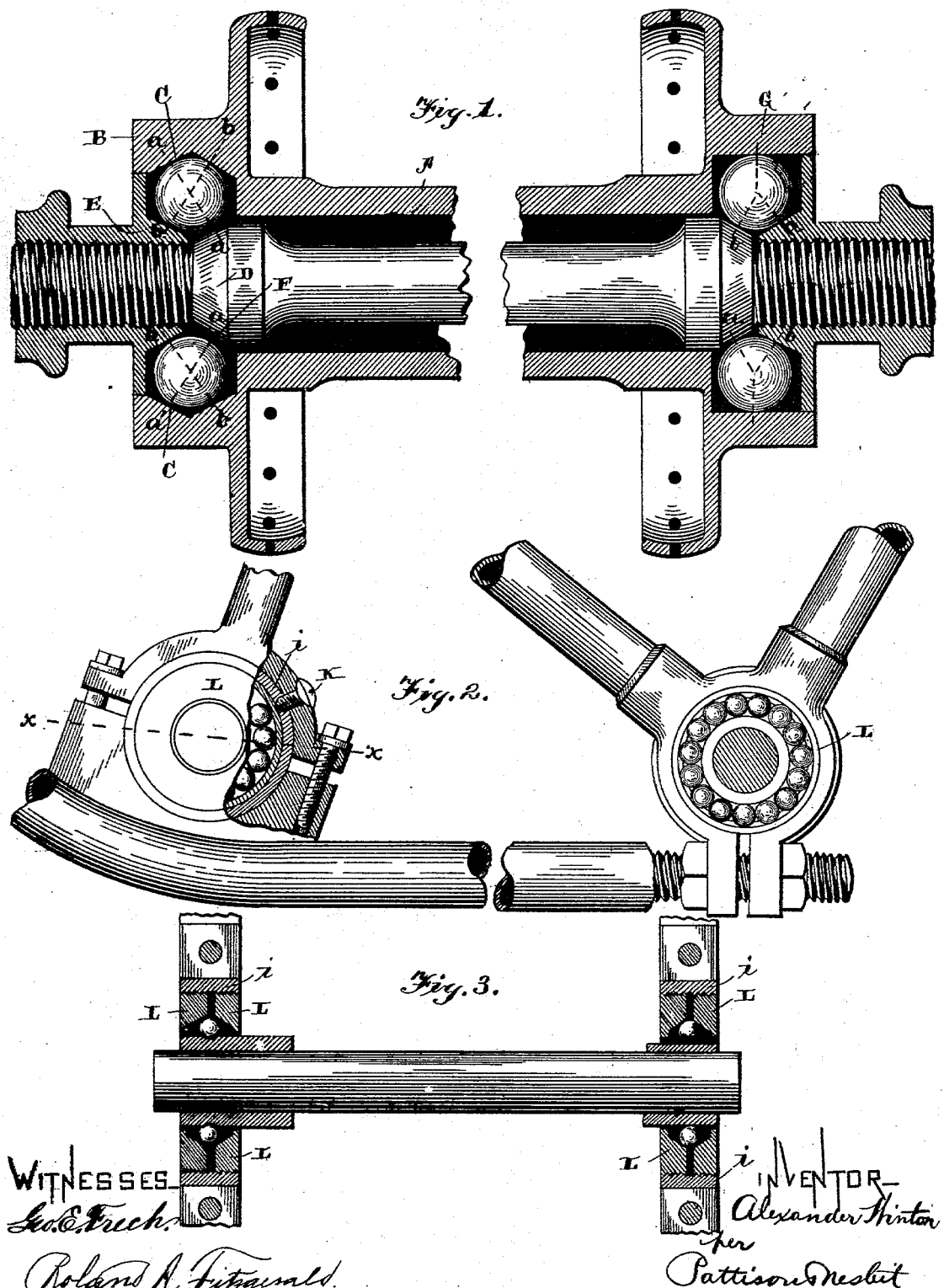

(No Model.)

A. WINTON.
BALL BEARING.

No. 511,228. Patented Dec. 19, 1893.

Witnesses
Geo. E. Frech.
Roland A. Fitzgerald.

Inventor
Alexander Winton
per
Pattison & Nesbit
attys.

UNITED STATES PATENT OFFICE.

ALEXANDER WINTON, OF CLEVELAND, OHIO.

BALL-BEARING.

SPECIFICATION forming part of Letters Patent No. 511,228, dated December 19, 1893.

Application filed January 11, 1893. Serial No. 458,031. (No model.)

*To all whom it may concern:*

Be it known that I, ALEXANDER WINTON, of Cleveland, in the county of Cuyahoga and State of Ohio, have invented certain new and useful Improvements in Ball-Bearings; and I do hereby declare the following to be a full, clear, and exact description of the invention, such as will enable others skilled in the art to which it pertains to make and use it, reference being had to the accompanying drawings, which form part of this specification.

My invention relates to improvements in ball bearings; and it consists in the construction and arrangement of parts which will be fully described hereinafter and particularly pointed out in the claims.

The object of my invention is to reduce friction in ball bearings by having the bearing at one end of the wheel hub or shaft so constructed that the balls can slide endwise the shaft or hub, thus adjusting themselves automatically to prevent any revolution thereof upon an axis at an angle to the rotation of the wheel, so common in ordinary ball bearings and which causes a grinding of the balls and thereby increased friction; and to prevent any crowding of the balls at one end of the hub by the jamming or crowding of the balls at the opposite end of the hub, caused by a slight variation in the diameter of the balls which always exists, and in some instances is increased or made very great by reason of the groove at one end of the wheel hub or shaft being even slightly out of a vertical line to the shaft, in which event it acts as a cam for crowding the balls at the opposite end of the hub or shaft.

In the accompanying drawings:—Figure 1 is an enlarged longitudinal sectional view of a wheel hub and shaft, my invention being shown applied thereto. Fig. 2 is a side view of a portion of a frame of a machine showing my improved yoke bearing, the bearings being shown in section. Fig. 3 is a horizontal section taken on the dotted line $x—x$ of Fig. 2.

My construction of ball bearing for reducing friction is shown in connection with a bearing wholly within the hub of a wheel in Fig. 1, and in Figs. 2 and 3 in connection with a yoke bearing.

A, indicates the hub of a wheel (Fig. 1) which has at one end a bearing sleeve B, and this sleeve is provided with an annular groove C, in its inner face. The adjacent end of the shaft has a rigid cone D, and an adjustable cone E, thus forming another annular groove F, in which the balls run, and which is the usual construction of an adjustable ball bearing. Instead of duplicating this construction at the opposite end of the shaft or hub, I provide a bearing sleeve G, which is entirely grooveless, and, in contradistinction to the usual construction, is made perfectly straight. The cones upon the adjacent end of the shaft to this straight bearing sleeve, are the same as at the opposite end of the shaft, and are of the usual construction. From this it will be seen that the balls in the old construction have the four bearing points $a, a$, and $b, b$, while in my new construction at the opposite end of the shaft the balls have but three bearing points.

As a matter of fact, the balls placed in ball bearings always vary slightly, and owing to this variation a ball in the old construction will fit tightly at either the bearing points $a, a$, or $b, b$, and in this instance the ball or balls thus wedged or tightly compressed will revolve or have a tendency to revolve upon an axis at an angle to the axis of revolution of the wheel, as represented by the dotted lines, and thus cause a grinding action at either the points $a, a$, or $b, b$, according to which axis it revolves upon, as will be clearly understood. This wedging and angular revolution of the balls is increased greatly in the rear driving wheel when climbing hills, owing to the increased pull upon the hub of the wheel.

By reference to my construction at the opposite end of the wheel, it will be seen that all tendency to revolve upon an angular axis is prevented, for the balls have free play upon the grooveless face of the adjacent bearing sleeve, thus automatically adjusting themselves to avoid this increased friction by grinding of the balls.

In order to hold the wheel against endwise movement, I am compelled to use the ordinary two-groove bearing at one end of the wheel hub. However, by the use of the improved smooth bearing at the opposite end, I do not only absolutely prevent any grinding of the balls at that end, but by its use prevent to a great extent, if not entirely this grinding in the old bearing at the opposite end. This is so because when a ball or balls wedge at either the points $a$, $a$, or $b$, $b$, there is necessarily a tendency to move the hub endwise to relieve this clamping or wedging action, and owing to my smooth bearing at the opposite end, the hub is allowed a free endwise movement, which will relieve the wedging and cramping of the balls in the old bearing.

Again, where an annular groove is used at each end of the hub, as in the old construction, it requires great care and skill, to have the groove at opposite ends of the hub, absolutely at right angles to the axis of revolution; while if either groove is out of this line, ever so slightly, it makes a cam of that groove acting against and crowding the balls in the groove at the opposite end of the hub. Now by the use of my smooth bearing at one end of the hub, there will be no crowding, cramping or grinding of the balls caused thereby, for any cam action of the untrue groove of the old bearing at one end of the hub only tends to move the hub endwise, which it is free to do. In Figs. 2 and 3 this same idea of a smooth bearing at one end of the hub is shown in connection with a yoke bearing. In this instance, however, it will be noticed that the smooth bearing is on the shaft, illustrating that the smooth portion can be made at either the inner or outer sides of the balls, and the result still be the same. So also in Fig. 1, the smooth bearing could be placed upon one end of the shaft, and grooves $b$, made in the inner bearing surfaces of both hub sleeves, and the result be the same.

Figs. 2 and 3 show yoke bearings which consist of a smooth exterior surface, and a screw threaded interior surface to which my invention is applicable. This sleeve is placed in the yoke and held by means of a screw K, and into this sleeve the cones L are screwed. This construction avoids the forming of screw threads directly in the inner surface of the yoke, which it is inconvenient to do. By the use of a sleeve the screw threads are conveniently and accurately formed therein, thus greatly facilitating and cheapening the forming of such bearings.

This bearing is also applicable to bicycle pedals, as will be understood.

Having thus described my invention, what I claim, and desire to secure by Letters Patent, is—

1. A ball bearing comprising a shaft, two co-acting grooved bearing surfaces for one end of the shaft or hub, balls placed in said grooves, a ball bearing for the opposite end of the shaft having a grooved and a co-acting grooveless surface, and balls engaging the last of said surfaces, substantially as specified.

2. The combination, of an axle and a hub, a bearing at each end thereof, a series of balls in one bearing adapted to rotate and prevented from longitudinal movement relatively to the axle and hub, and a series of balls in the other bearing adapted to rotate around the axle and capable of longitudinal movement relatively to the axle or hub, whereby the axle and hub are allowed a limited independent longitudinal movement in relation to each other, for the purpose described.

In testimony whereof I affix my signature in presence of two witnesses.

ALEXANDER WINTON.

Witnesses:
L. W. LEWIS,
L. A. REED.